US006395356B1

(12) United States Patent
Wielockx et al.

(10) Patent No.: US 6,395,356 B1
(45) Date of Patent: *May 28, 2002

(54) FOOD CASINGS HAVING MODIFIED RELEASE PROPERTIES AND METHODS OF MANUFACTURE

(75) Inventors: Pierre Wielockx, Lommel; Luc Borgers, Lummen, both of (BE)

(73) Assignee: Teepak Properties, LLC, Lisle, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 08/856,117

(22) Filed: May 14, 1997

(51) Int. Cl.$^7$ ................................. A22C 13/00
(52) U.S. Cl. .................. 428/34.8; 138/118.1; 264/188; 452/27; 206/802
(58) Field of Search ...................... 428/34.8; 138/118.1; 264/188; 452/27; 206/802

(56) References Cited

U.S. PATENT DOCUMENTS

| 2,802,745 A | * | 8/1957 | Bösel ........................ 428/34.8 |
| 3,378,379 A | | 4/1968 | Shiner et al. .................. 99/176 |
| 3,645,760 A | * | 2/1972 | O'Brien et al. ............. 426/135 |
| 4,142,013 A | * | 2/1979 | Hammer et al. ........... 428/34.8 |
| 4,563,376 A | * | 1/1986 | Hammer et al. ........... 428/34.8 |
| 4,781,931 A | * | 11/1988 | Jon et al. .................... 426/132 |
| 4,788,087 A | * | 11/1988 | Wilke et al. ............... 428/34.8 |
| 5,199,465 A | * | 4/1993 | Stiem ....................... 138/118.1 |
| 5,603,884 A | * | 2/1997 | DuCharme, Jr. et al. ... 264/203 |
| 5,795,522 A | * | 8/1998 | Firgo et al. ................. 264/187 |

FOREIGN PATENT DOCUMENTS

| CA | 1324288 | * | 11/1993 | |
| EP | 0 001 867 A2 | | 11/1978 | |
| EP | 0001867 A2 | * | 10/1979 | ................ 428/34.8 |
| EP | 0635211 A1 | | 1/1995 | |
| GB | 1086604 | | 10/1967 | |
| GB | 1544155 | | 4/1979 | |

* cited by examiner

*Primary Examiner*—Harold Pyon
*Assistant Examiner*—Sow-Fun Hon
(74) *Attorney, Agent, or Firm*—Michael L. Dunn

(57) ABSTRACT

Regenerated cellulose food packaging film, including fibrous food casings which has modified cling properties for packaging sausage products. The cellulosic food casings have a fibrous reinforcement impregnated with regenerated cellulose composition which contains from about 0.01 to 2.5 weight percent of admixture of a viscose solution and a food grade cationic resin adhering agent and from about 0.001 to 2.5 weight percent of a protein. The film is prepared by impregnating a tubular fiber reinforcement with a viscose composition containing the resin and protein. The impregnating composition is applied in a single step by injecting the resin and protein into the viscose solution before being extruded into the fibrous web. This assures both even distribution of the polymeric adhering agent and protein in the web, as well as maintenance of a constant level of polymer and protein being applied during the coating process. The degree of cling/adherence of the casing to meat contained in the film is more uniform over the entire circumference of the tubular casing and is almost moisture independent.

16 Claims, No Drawings

FOOD CASINGS HAVING MODIFIED RELEASE PROPERTIES AND METHODS OF MANUFACTURE

TECHNICAL FIELD

The present invention relates generally to improved food packaging films, and more specifically, to food casings having modified release/cling properties for packaging meat products. The food casings may be fiber reinforced or unreinforced and may be used to package both wet and dry meat products.

BACKGROUND OF THE INVENTION

In the manufacture of processed sausage products, a meat emulsion is prepared from comminuted meat together with fillers, seasonings, spices, etc. A tubular food casing, such as one containing nonedible cellulose, is loaded onto the stuffing horn of a filling machine and stuffed with the meat emulsion. In the case of small sausage products, like frankfurters, the filled casings are twisted, tied or clipped into suitable links at predetermined intervals and further processed. For larger sausage products, like bologna, salami, and the like, the meat emulsion is introduced into larger heavier walled casings or casings having fibrous reinforcements, and formed into chubs or lengthy individual sausage sticks or logs for further processing, e.g., cooking and smoking.

One category of larger meat products includes the so-called dry or semi-dry sausages, sometimes referred to as cervelats or summer sausage, which includes such representative examples as air dried pepperoni, soft salami, hard or dry salami, and the like. As the name suggests, this type of sausage has a reduced moisture content, and its preparation usually includes drying as one step in its manufacture. Dry sausage can also have a lower fat content than other types of sausage products, and depending on the particular type, may also be smoked. Cooking can also be performed in some instances during the smoking step.

Food casings employed in packaging and processing dry or semi-dry sausage products are usually fibrous type casings consisting of a fibrous reinforcement in the form of a web, usually a paper, formed and seamed into a tubular body, impregnated with viscose solution and regenerated in situ. Because the encased meat mass of dry or semi-dry sausage products undergo shrinkage during processing and drying, dry sausage casings preferably have an affinity for the encased meat mass. That is, unless the dry sausage casing adheres to the meat mass during processing and drying, separation between the meat mass and the sidewall of the casing occurs which increases the potential for mold growth, and a final product having an unappetizing appearance. Such products not only have poor customer acceptance, but can also have shorter shelf-life expectancies.

To help overcome the foregoing separation problem with dry/semi-dry sausage products, fibrous regenerated cellulose casings have been developed with polymeric coatings consisting of thermosetting resins to enhance the cling or adherence properties between the meat mass and the inner side wall of the casing. One such example is disclosed in U.S. Pat. No. 3,378,379, which teaches a dry fibrous sausage casing having a cationic thermosetting resin coating on the casing surface in contact with the packaged meat.

While the coated casing of U.S. Pat. No. 3,378,379, may be useful in allowing the passage of moisture from the meat mass during drying, ingress of smoke to the meat during smoking, and adherence to the meat mass as the meat shrinks due to loss of moisture, such casings and methods of manufacture have not been entirely satisfactory for all types of dry and semi-dry sausage products. In this regard, it was found that dry sausage type fibrous casings, including the type of casings coated according to the methods of U.S. Pat. No. 3,378,379, with cationic thermosetting resins, can exhibit excessively high cling characteristics, and cannot be readily used with all types of dry sausage recipes because of an imbalance between cling/adherence and release properties. Furthermore, the cling of such casing varies with the amount of moisture in the sausage product.

For example, certain dry sausage recipes, like dipped style products favored by many Europeans require partial removal of casing by meat processors during the latter stages of preparation after cooking and drying. For this to readily occur, the dry sausage casing must have a sufficiently low level of cling to permit easy manual peeling of the casing from the meat mass without damaging the product. In preparing dipped style dry sausage the casing is entirely removed, except for the end portion holding the support string or metal end-closure cap for suspending the product during the final stages of processing. The remaining unpeeled casing end must continue to adhere to the meat mass for support and prevent falling to the floor during the final stages of processing, e.g., dipping into gelatin and condiments, e.g., pepper, cheese, roasted onions, etc. Hence, for such dry sausage recipes packaging films/casings require a balance of both cling/adherence properties and release characteristics. Too much cling and not enough release will make manual peeling a slow, arduous task for high production efficiency. Whereas, too high release and not enough cling will make the dipping process difficult to perform. It would further be desirable if the cling/adherence of such casings were constant regardless of the amount of residual moisture in the sausage product.

U.S. Pat. No. 3,378,379 discloses methods for enhancing the cling properties of dry sausage casing by applying internal coatings of cationic thermosetting resin by the known "slugging" or "bubble" technique. Following impregnation of the fibrous tubular web with viscose solution by drawing through an annular die; regeneration of the casing and passage through a glycerin/water bath, an aqueous solution of the thermosetting resin is introduced through a cut in the casing by known methods, e.g., U.S. Pat. No. 3,378,379, which resin is maintained between rolls of the coating station. The regenerated casing is continuously drawn between the rolls where the interior wall of the casing is automatically coated with the resin solution. Squeeze rolls remove excess resin from collecting on the casing interior wall. Following coating, the casing is drawn through a drying chamber where it is inflated by a bubble of air and dried.

While the bubble technique may be widely practiced in applying release/cling coatings to casing surfaces, it has several short-comings. The bubble method is dependent on many process variables making it difficult to achieve product uniformity and quality control. This is due to such variables as rate of casing travel; initial concentration of the coating solution; rate of exhaustion and depletion of resin from the coating solution; amount of pressure applied by the squeeze rolls, etc. Such factors determine the amount of resin with which the inner wall of the casing will be coated and the frequency with which the coating composition will require replenishing. Liquid transfer from tanks can also dilute the bubble in standard operations. Because the resin in solution between the rolls is constantly being depleted from the casing interior the coating being applied lacks uniformity and produces a "two side effect", i.e., different meat cling over the circumference of the casing. The bubble method of coating can also result in "roping" and "carry over" of the casing where multiple folds of casing prevent removal of chemicals.

In order to avoid the above described problems, it has been suggested that certain resins could be incorporated into viscose used to form the casing either by extruding the resin containing viscose in the form of a tubular film or by impregnating a tubular fiber reinforcement with the resin containing viscose. Such a method and product is described in European Patent Application 0.635.211, published Jan. 25, 1995, which is the equivalent of copending U.S. patent application Ser. No. 08/096,320, filed Jul. 23, 1993, from which priority is claimed. While the method described in European Patent Application 0.635.211 was an improvement over prior methods for controlling adhesion to meat product within a food casing, due to the nature of adhering resins it was difficult to "fine tune" adherence characteristics in a reproducible manner which are similar under both wet and dry conditions.

Accordingly, there is a need for modified fibrous type food casings particularly for dry and semi-dry sausage products which offer a better balance between adherence/cling and release properties. In particular, there is need for more efficient methods of preparing fibrous casings with low cling properties where such properties can be replicated with better quality control and uniformity between production runs through less manual handling (bubble changes), automatic dosing of the adhering agent, and more consistent amounts of adhering agent being applied. There is further a need for being able to fine tune adherence characteristics for various food casing products which are similar under both wet and dry conditions.

SUMMARY OF THE INVENTION

It is therefore a general object of the invention to provide for fibrous reinforced food packaging films, and particularly food casings having predictably modified cling or release properties with the food-stuff packaged therein regardless of moisture content.

More specifically, it is a principal object of the invention to provide for fibrous reinforced food packaging films, including tubular food casings having cling/adherence properties which are especially useful in packaging dry or semi-dry sausage or summer sausage products, such as pepperoni, hard and semi-soft salamis, and the like.

It is yet a further object to provide for novel fibrous food casings for facilitating the production of special dry sausage recipes requiring reduced levels of cling, or more balance between adherence/cling and release properties with the packaged foodstuff.

It is yet a further object of the invention to provide for a method of preparing regenerated cellulose food casings having a fibrous reinforcement in the form of a tubular body with interior and exterior wall surfaces by the steps of impregnating the surfaces with a viscose solution and regenerating the casing, wherein the improvement comprises the steps of forming a coating composition comprising a novel admixture of the viscose with additives which imparting to the casing cling properties for the food product packaged therein which have the desired adherence/cling characteristics which are reproducible and almost constant under wet and dry conditions.

These and other objects, features and advantages will become more apparent from a reading of the following more detailed description of the invention.

The invention comprises a regenerated cellulose food packaging film, including fibrous food casings which has modified cling properties for packaging sausage products. The cellulosic food casings preferably have a fibrous reinforcement impregnated with regenerated cellulose vicose composition which contains from about 0.01 to 2.5 percent of a food grade cationic resin adhering agent by weight of cellulose and from about 0.001 to 2.5 weight percent of a protein by weight cellulose. The film is prepared by impregnating a tubular fiber reinforcement with a viscose composition containing the resin and protein. The impregnating composition is applied in a single step by injecting the resin and protein into the viscose solution before being extruded as a tubular film or into a fibrous web. This assures both even distribution of the polymeric adhering agent and protein in the food casing, as well as maintenance of a constant level of polymer and protein being applied during the coating process. The degree of cling/adherence of the casing to meat contained in the film is more uniform over the entire circumference of the tubular casing and is almost moisture independent. The food packaging film is usually a tubular food casing which may be unreinforced or reinforced, e.g. with a fibrous web. The food packaging film is most commonly a fiber reinforced tubular sausage casing. The invention also includes a method for manufacture of the above food packaging films.

DETAILED DESCRIPTION OF THE INVENTION

The modified package can be in the form of regenerated cellulose food packaging films and tubular shaped food casings. The invention contemplates casings being supplied as relatively short individual precut lengths of flat, unshirred tubular material, as well as extended lengths of flat unshirred tubular material wound on large storage and dispensing reels. The present invention also contemplates tubular casings pleated into shirred strands or sticks for convenient handling and efficient production during stuffing operations.

The regenerated cellulose packaging films and casings usually comprise a fibrous reinforcement, typically paper, which is impregnated with a novel coating composition. The composition prior to being applied to the reinforcement comprises viscose solution in admixture with a combination food grade cationic polymeric adhering agent and a protein for imparting cling between the film/casing and food product engaged therewith. That is, instead of applying the thermosetting resin as a separate coating to the web after impregnation and regeneration of a viscose-containing web it was discovered that desirable, predictable and reproducible cling/adhering properties can be imparted to the film in a step prior to film formation by injecting a predetermined amount of a resin protein mixture into the viscose solution prior to impregnating the fibrous reinforcement. Thus, the resin and protein in a ratio known to give a predictable adherence characteristic under both wet and dry conditions is applied as a component of the viscose solution in the form of an admixture simultaneously during impregnation of the fibrous web.

It was also found that fibrous webs impregnated with viscose-containing compositions as disclosed herein together with a food grade cationic polymeric adhering agent in admixture with a protein imparts a more uniform and reduced level of cling/adherence between the packaging film and meat mass than other known regenerated cellulose casings having separate coatings of such agents.

For purposes of the present invention, expressions such as "reduced" or "low level cling properties" are intended to refer to casings of this invention which readily allow manual separation from a processed or partially processed and packaged meat product without damaging the meat mass during removal. End portions of casing remaining in-tact are capable of supporting the weight of the meat product without premature separation from the meat mass.

Viscose, as used herein, includes traditional xanthate viscose as well as solutions of cupra-ammonium and carbamate derivatized cellulose. As used herein, viscose also includes true solutions of cellulose, e.g. in tertiary amine oxide.

The preferred embodiments of the invention relate principally to fibrous reinforced food casings, mainly for semi-dry and dry sausage products; however, the same invention may be applied to unreinforced food casings and "wet" meat product. In a preferred embodiment, the casings comprise a tubular shaped fibrous web of conventional form having an interior and exterior side wall impregnated with a coating composition. The coating composition comprises a viscose solution in the form of an admixture with a cationic polymeric adhering agent and protein for imparting cling properties for a food to be stuffed therein. Optionally, but preferably, it will be more convenient to have both the interior and exterior sidewalls of the casing impregnated with the coating composition containing the cationic polymeric adhering agent.

Generally, the fibrous reinforcements for the casings are prepared from fibers approved for use in food wrapping applications. Although not limited to, they include for instance, any cellulosic material, and particularly high strength fibers, as for example, Philippine hemp fibers, cotton fibers, wood fibers, and their derivatives. Embodiments of fibrous reinforcements are intended to include naturally occurring cellulosic material impregnated in slurry form, but more preferably in the form of a web. That is to say, one embodiment involves food wrappings prepared with webs or sheets of woven, but preferably nonwoven fibers which includes various types of paper and paper products. In most instances, the reinforcement of choice is the most economic fibrous web which will impart the required strength and other characteristics which are consistent with the properties of the casings described herein. Other desirable reinforcements may be prepared in addition to those mentioned above. They include mixtures of Philippine hemp fibers with long fibered soft wood fibers, or mixtures of soft wood fibers with synthetic rayon paper making fibers or textile rayon fibers, etc. Synthetic webs prepared from woven, nonwoven, and even spun fibers like polyesters, such as available under the DuPont™ "Reemay"; or various polyamides like nylon 6; nylon 6,6,etc., may also be employed.

The binder for impregnation of the fibrous reinforcement is a composition comprising viscose solution in combination with the cationic polymeric adhering agent and protein. The resin and protein being present in a sufficient amount to impart predictable and reproducible low level cling/adherence properties to the casing when in contact with a meat mass, e.g., sausage emulsion. The cling properties are similar under both wet and dry conditions. As previously discussed, low levels of cling are intended to denote that amount of adherence which enables facilitating manual separation of the casing from the meat mass, which may be partially processed. The process of separation and removal of the casing is facilitated without stripping meat from the surface of the meat mass. Adherence characteristics, i.e., cling and release, may be balanced, so end portions of the casing, for example, remaining on the meat mass after partial peeling, have sufficient cling to remain in tact for support of the meat mass during any remaining processing steps, such as dipping without prematurely separating.

The casings have a fibrous reinforcement comprising a generally tubular shaped web having interior and exterior walls with at least the interior wall being uniformly impregnated with an impregnating (coating) composition. Advantageously, casings impregnated with the compositions have more evenly applied cling type resins. The casings can be more readily separated and removal facilitated from the meat product during processing than regenerated cellulose casings prepared with similar type resins or proteins, but applied as separate coatings, such as by the bubble technique. The food grade polymeric adhering agent is present in the viscose-containing impregnating composition in a sufficient amount to impart low level cling properties to the film in conjunction with the protein when the regenerated viscose is in contact with the foodstuff. More specifically, the impregnating composition comprises from about 0.01 to less than about 2.5 percent by weight of cellulose and preferably from 0.01 to less than 0.75 percent by weight of cellulose of a food grade cationic polymeric adhering agent (resin) which, for example, may be an epoxy substituted polysecondary amine, or alternatively, a melamine-formaldehyde polymer.

Preferred polymeric adhering agents include certain food grade thermosetting aldehyde polymers like the amino resins, such as melamine formaldehyde polymers. They are commercially available from American Cyanamide under the trademark ACCOBOND. ACCOBOND 3524, for example, is a highly methylolated melamine-formaldehyde precondensate. Other suitable polymeric adhering agents include the water soluble epoxy-substituted polysecondary amine thermosetting resins. Generally, they are condensates of epichlorohydrin and a polyamide. That is oligomers or higher molecular weight resinous materials having a plurality of secondary amine groups, e.g., polyamide amines, polyurea amines, and the like. The epoxy substituted polysecondary amine cationic thermosetting adhering agents are preferably condensation products of epichlorohydrin and a polyamine prepolymer formed from a dicarboxylic acid, such as adipic acid, glutaric acid and succinic acid, and a diethylenetriamine. Variations of the epoxy substituted polysecondary amines may be useful adhering agents by modifying the internal structure of the diethylenetriamine and/or by employing alternative dicarboxylic acids, such as those mentioned above. Particularly useful cationic thermosetting adhering agents are commercially available from Hercules, Inc., under the trademark KYMENE®, e.g., grade 557. Such products are also known as Hercules Resin 2000 or RESAMINE® which are also water soluble thermosetting cationic polymers, i.e., reaction products of epichlorohydrin and adipic acid-diethylenetriamine polyamide.

Specific examples of suitable resins are polyamine-polyamide resins, polyethyleneimine resins and vinyl amine-N vinyl formamide combination resins. Acceptable polyamine-polyamide resins are commercially sold under the trademarks KYMENE 557H and KYMENE SLX by Hercules, RESAMINE 3632 and RESAMINE 3608 by Hoechst and LURESIN KTU by BASF. Suitable polyethylene-imine resins are sold under the trademarks LUPASOL SK and LUPESOL P by BASF and suitable vinyl amine-N vinyl formamides are sold under the trademark BASOCOL PR8086 by BASF.

The protein is used in conjunction with the resin in an amount of from 0.001 to 2.5 weight percent based upon cellulose content. The ratio of resin to protein is from 100:1 to 1:1 and preferably from 100:1 to 10:1. The protein content is usually about 0.04 to 0.10 percent by weight of cellulose.

A wide range of proteins can be used in accordance with the present invention such as soy protein, gelatine, collagen and plasma.

Causticized xanthate viscose solutions typically have high pHs in the range of about 9 to 12. To prevent pH shock between the lower pH polymeric adhering agent and viscose solution it has been found advantageous to buffer the compositions to a pH generally in the range from about 7.5 to about 12, and more preferably, to pHs from about 9 to about 11 with ammonia solution (26 percent).

The regenerated cellulosic fibrous food casings of the invention are manufactured using standard equipment employed by casing manufacturers they may be prepared, for instance, by impregnating a fibrous web by extruding the viscose-containing coating compositions of the invention into a fibrous web using a coating die of conventional design, such as a double viscose coating die which continuously coats both the inner and outer sidewalls of the tubular web. The coated tubular web is then regenerated in a coagulating bath. The regenerated gel casing is then washed and plasticized, usually in a glycerine-containing bath. The plasticized gel film is inflated and passed through lengthy gas fueled hot air dryers where the moisture content of the casing is reduced to a relatively low level, e.g., 5 to 10 percent. The dried casings may be shirred into tightly compressed strands, rolled as flat stock onto reels, etc., and packaged.

In practice, the cationic polymeric adhering agent protein mixture is injected into the viscose solution before being extruded into the fibrous web. This assures both even distribution of the polymeric adhering agent and protein in the web, as well as maintenance of a constant level of polymer being applied during the coating process. As a result, the degree of cling/adherence of the casing to the meat mass is uniform over the entire circumference of the tubular casing and is reproducible. The cling characteristics are similar under both wet and dry conditions.

The following examples serve to illustrate and not limit the present invention.

EXAMPLE 1

A mixture of KYMENE 557H polyamine-polyamide resin and soy protein SUPRO 535 from Proteins Technology, Inc., was tested at a ratio of protein to resin of 0.05:1. The concentration of KYMENE incorporated into the cellulose was 0.37 weight percent and the concentration of protein incorporated into the cellulose was 0.019 weight percent. Injection took place at a pH of 8.5. The meat adhesion force was measured using an Instron device (strip of 4 cm). A meat cling of 350 grams was measured in a dry environment, while in wet condition 400 grams was reached. A standard without the resin-protein performed from 500 dry to 850 grams wet stage.

EXAMPLE 2

The procedure of Example 1 was followed except that the concentration of KYMENE was 1.88 weight percent of cellulose and the concentration of protein was 0.094 weight percent of cellulose. The meat cling was measured at 780 grams in a dry environment and 710 grams in a wet environment.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

What is claimed is:

1. A tubular cellulosic film meat casing, which comprises a tubular fibrous reinforcement impregnated with a viscose coating composition containing cellulose, wherein said composition, prior to being impregnated into said reinforcement, comprises an admixture of a viscose solution, a food grade cationic resin adhering agent and a protein for imparting to said film, cling properties for a meat product packaged within such film, said resin being present in an amount of from about 0.01 to about 2.5 percent by weight of cellulose and said protein being present in an amount of from about 0.001 to about 2.5 percent by weight of cellulose, a weight ratio of resin to protein being between 100:1 and 1:1 said tubular film having a cling force to encased meat product under both wet and dry conditions of between 350 g/4 cm and 800 g/4 cm, said cling force, under both wet and dry conditions, being sufficient to hang said food casing when stuffed with meat, by an end and weak enough to permit the food casing to be removed from encased meat product without damaging the surface of the meat product.

2. The food packaging film of claim 1 wherein said viscose-containing coating composition comprises from about 0.01 to less than about 0.75 percent by weight of said cationic resin adhering agent.

3. The fibrous food casing of claim 1 wherein said fibrous reinforcement comprises a generally tubular shaped web having interior and exterior walls with at least said interior wall being uniformly impregnated with said viscose composition.

4. The food packaging film of claim 1 wherein said food grade cationic polymeric adhering agent is a thermosetting material selected from the group consisting of epoxy substituted poly-secondary amines and melamine-formaldehyde polymers.

5. The food packaging film of claim 4 wherein said epoxy substituted polysecondary amine thermosetting polymer is a condensation product of epichlorohydrin and a polyamine prepolymer formed from a dicarboxylic acid and a diethylenetriamine.

6. The food packaging film of claim 5 wherein said coating composition is buffered to a pH in the range from about 7.5 to about 12.

7. The food packaging film of claim 1 wherein the protein is selected from the group consisting of soy protein, gelatine, collagen and plasma.

8. The fibrous food casing of claim 1 wherein the cling properties are characterized by readily permitting manual separation of said casing from a partially processed meat product packaged therein without separation of meat portions from said product during removal.

9. A method of preparing the meat casing of claim 1 by forming a viscose solution into the shape of a tube and regenerating the casing, wherein the viscose solution is formed by admixing viscose, from about 0.01 to about 2.5 percent by weight of cellulose in the viscose of a food grade cationic resin adhering agent and from about 0.001 to about 2.5 percent by weight of cellulose in the viscose of a protein in a weight ratio of resin to protein of between 100:1 and 1:1, for imparting to said casing cling properties for a meat product packaged therein, and impregnating the surfaces of said fibrous reinforcement with said coating composition prior to regeneration and regenerating the composition to obtain a cling force to encased meat product under both wet and dry conditions of between 350 g/4 cm and 800 g/4 cm, said cling force, under both wet and dry conditions, being sufficient to hang said food casing when stuffed with meat, by an end, and weak enough to permit the food casing to be removed from encased meat product without damaging the surface of the meat product.

10. The method of claim 9 wherein the food casing further comprises impregnating interior and exterior walls of a tubular fibrous reinforcement with the viscose composition.

11. The casing of claim 1 wherein force to remove the casing from meat varies by less than 10 percent between wet and dry conditions.

12. The casing of claim 1 wherein the viscose solution is xanthate viscose solution.

13. The casing of claim 1 wherein the viscose solution is tertiaryamine oxide viscose solution.

14. The method of claim 9 wherein force to remove the casing from meat varies by less than 10 percent between wet and dry conditions.

15. The method of claim 9 wherein the viscose solution is xanthate viscose solution.

16. The method of claim 9 wherein the viscose solution is tertiaryamine oxide viscose solution.

\* \* \* \* \*